Oct. 28, 1969  R. H. TOUBHANS  3,474,991
SUPPORTING HOLDER FOR MEASURING TOOL
Filed Oct. 30, 1967
FIG_1
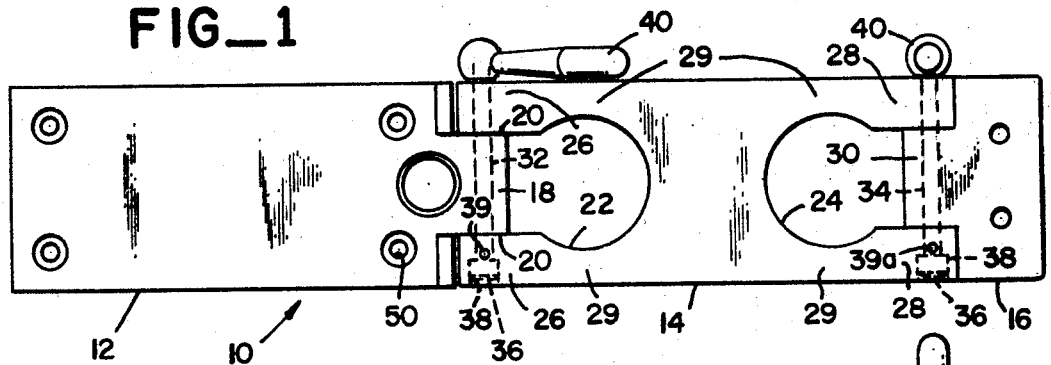
FIG_2
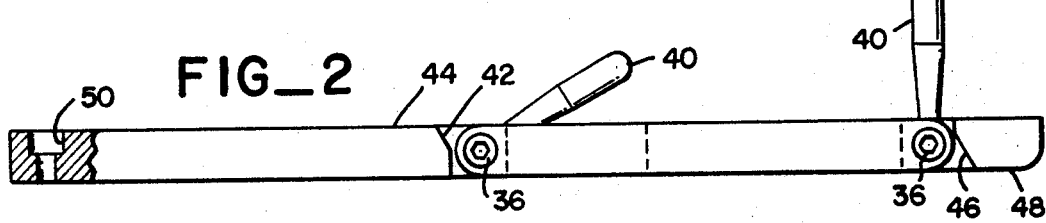
FIG_3
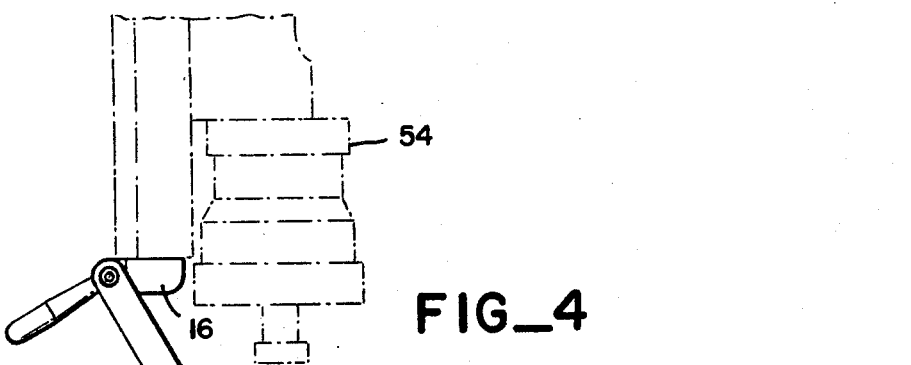
FIG_4
INVENTOR.
RENE H. TOUBHANS
BY
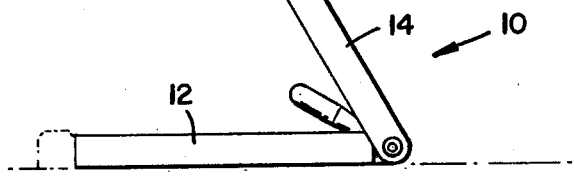
ATTORNEYS

United States Patent Office

3,474,991
Patented Oct. 28, 1969

3,474,991
SUPPORTING HOLDER FOR MEASURING TOOL
Rene H. Toubhans, 4921 E. Fairmont Ave.,
Tucson, Ariz. 85716
Filed Oct. 30, 1967, Ser. No. 678,956
Int. Cl. A47h 29/00
U.S. Cl. 248—12                         3 Claims

ABSTRACT OF THE DISCLOSURE

A mounting device for a micrometer type instrument includes three pivotally connected sections that can support the instrument in either a horizontal position or in an upright position. To provide support for the latter position the sections are moved to and retain themselves in positions angularly displaced from each other.

---

This invention relates to an improved holder for supporting various tools and instruments, and more particularly for supporting sensitive measuring devices such as micrometers or the like.

In order to produce accurate measurements with precision micrometers on various articles, it is necessary that the instrument be mounted firmly. Yet, it must also be mounted so as to be easily manipulated as measurements are made. Further, it is often desirable to be able to move the instrument to a position tilted from the horizontal while still maintaining the rigidity and firm support of the instrument. A general object of the present invention is to solve the aforesaid problems by providing a tiltable mounting device that will support an instrument such as a micrometer in either the horizontal position or in a range of tilted positions.

Another object of the present invention is to provide a tiltable mounting device for precision instruments that has relatively simple but unique construction, which is strong, durable and compact, and yet particularly well adapted for ease and economy of manufacture.

Still another more specific object of my invention is to provide a mounting device for precision instruments comprised of pivotally connected base members, one of the base members having a pair of slightly yieldable and spring-like, spaced apart jaw portions at each end. Each pair of jaws can be independently compressed to grip a tongue portion of the other attached base member so that the combination of base members can be readily locked in a wide range of positions while supporting an instrument.

Other objects, advantages and features of the invention will become apparent from the following detailed description of one embodiment of the present invention presented in conjunction with the accompanying drawings, in which:

FIG. 1 is a plan view of a fully extended instrument holder or support embodying the principles of the present invention;

FIG. 2 is a view in side elevation of the holder or support shown in FIG. 1;

FIG. 3 is a reduced scale view in side elevation of the instrument holder of FIGS. 1 and 2 supporting horizontally a typical micrometer which is shown in phantom;

FIG. 4 is a view in side elevation of the instrument holder of FIG. 3, shown supporting a typical micrometer in phantom in the upright position.

Referring to the drawing, FIG. 1 shows a holder 10, embodying the principles of my invention as it appears when fully extended horizontally. Generally, it comprises three base members 12, 14 and 16 which are connected together in a manner that allows them to be moved from an axially aligned orientation with each other as in FIG. 2 to positions wherein the members are angularly oriented to each other as in FIG. 4. The first or fixed horizontal member 12 has essentially a rectangular configuration and a uniform width and thickness and is preferably made of a durable metal. At one end it has a projecting tongue portion 18 with parallel sides 20 which facilitates a pivotal or hinge connection with the adjoining base member 14. This latter intermediate base member has the same width and thickness as the first base member 12 and substantially the same length. However, extending inwardly from its ends are a pair of slot-like openings 22 and 24 each forming a pair of spaced apart jaw-like bearing portions 26 and 28, respectively. The openings 22 and 24 each preferably have a keyhole shape so that relatively thin portions 29 are formed inwardly from the end of each bearing portion thereby affording them with a slight degree of resilient flexibility when acted upon by an external transverse force. At one end, the bearing portions 26 having parallel sides are just wide enough to fit snugly over the tongue portion 18 of the first base member 12. At the other end, the bearing portions 28 similarly fit around an extended tongue portion 30 of the third base member 16 which is relatively short compared with the base members 12 and 14 but preferably has the same width and thickness.

The horizontal and intermediate base members 12 and 14 are pivotally connected by a hinge or pivot pin 32 which extends through both of the bearing portions 26 and the tongue member 18. Similarly, at the other end of the intermediate base member 14 a second hinge or pivot pin 34 extends through the bearing portions 28 and the tongue portion 30 to pivotally connect it to the third and relatively small base member 16. Each of these pivot pins 32 and 34 is provided with a cap screw head 36 at one end that fits within an enlarged countersunk recess 38 so that its outer surface is flush with the side of a bearing portion. The other threaded end of each pivot pin is attached to an enlarged internally threaded head of a handle 40 which extends normal to the pin axis. As each handle is rotated on its respective pivot pin it forces the spring-like bearing jaws together against the sides of the tongue portion of the adjoining base member which is between them. This serves to lock the adjoining base members in any relative angular position. A set screw 39 extends downwardly from the top surface of one bearing portion 26 and normal to the pivot pin near the head end 36. When tightened, this set screw engages the pivot pin 32 to hold it in a predetermined angular position relative to the base member 14 and prevent rotation when the handle is being tightened. This is important because it enables the pivot pin position to be adjusted so that its handle will always be in a predetermined position when the base members are locked. A similar set screw 39a is provided in a bearing portion 28 for the pivot pin 34.

As shown in the drawing, the first base portion 12 is provided with surfaces 42 at one end on opposite sides of the tongue portion 18 that are beveled to form a predetermined angle (e.g., 120°) with respect to its upper horizontal surface 44. Similarly, the short third base portion 16 has a pair of surfaces 46 on the opposite sides of the tongue portion 30 which are beveled at the same angle as the surfaces 42 but with respect to its bottom surface 48. These beveled surfaces 42 and 46 serve as stops to limit the relative pivotal movement of the base members and thereby to position an instrument on my mounting device in an upright position.

The first base member 12 is preferably provided with a series of countersunk bore holes 50 so that it can be attached, if desired, to unitary blocklike base member 52, as shown in phantom in FIG. 3.

In operation, when a typical measuring instrument such as a micrometer 54 (as shown in phantom) is supported by my mounting device 10, the third base member 16 is in an upright position and may be fixed to one vertical end face of the instrument by suitable screws or the like. As shown in FIG. 3, the instrument is thus firmly supported in the horizontal position.

In FIG. 4, the mounting bracket 10 is shown supporting the micrometer instrument 54 in the upright position. Here, the second base member 14 is pivoted upwardly and back so that the upper surfaces of the bearing arms 26 are in contact with the beveled surfaces 42 at the end of the first base member 12. In a similar manner, the third base member 16 is rotated forwardly to a relatively horizontal position with its beveled surfaces 46 flush against the lower surfaces of the bearing portions 28. Since the beveled surfaces 42 form the same angle with the top 44 of the first base member 12 as the beveled surfaces 46 do with the bottom surface 48 of the third base member 16, the latter assumes a horizontal position when both pairs of the beveled surfaces are in contact with the second base member. To assure rigidity of the mounting device in this position the hinge pins 20 may be tightened by the handles 40. The micrometer or whatever instrument is being supported is thus held in precisely a vertical position. If desired, intermediate positions between the full horizontal and vertical positions by turning the threaded handle on its hinge pin when the base members have been set in the desired position. As the handle is turned the resilient jaw-like bearing portions clamp tightly on the tongue of the adjoining base member and hold it firmly in the preselected position.

From the foregoing, it should be apparent that the present invention describes a mounting device having a construction that provides unusual rigidity and stability for precision work coupled with the desirable positioning versatility. All of the base members may be made from relatively light but durable material such as a suitable metal, thus enabling the present support to be constructed economically by conventional means and yet with the required precision.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A device for supporting an instrument in either a horizontal position or an upright position comprising:
    an intermediate movable base member having a pair of spaced apart bearing portions at each end;
    a fixed horizontal base member having an extended tongue portion with parallel sides at one end which fits between said bearing portions at one end of said intermediate base member;
    a relatively short movable base member adapted to be fixed to said instrument and also having a tongue portion which fits between said bearing portions at the other end of said intermediate base member;
    hinge means at each end of said intermediate base member for pivotally connecting it to said fixed base member and to said short movable base member;
    means attached to said hinge means for locking said base members at preselected angular positions relative to each other;
    a beveled portion on one end of said fixed horizontal member for engaging the upper surface of said intermediate member when it is rotated to a position forming an angle of less than 90° with said fixed member; and
    a beveled portion on one end of said relatively short movable member for engaging the lower surface of said intermediate member, thereby limiting the angular position of said short member relative to said intermediate member in a direction opposite from said fixed horizontal member.

2. The device as described in claim 1 wherein said beveled portions form the same angle with the upper and lower surfaces of said intermediate member, whereby said short movable member assumes a horizontal position when said other base members are in their limited angular position.

3. A device for supporting an instrument in either a horizontal position or an upright position comprising:
    an intermediate movable base member having a pair of spaced apart bearing portions at each end;
    a fixed horizontal base member having an extended tongue portion with parallel sides at one end which fits between said bearing portions at one end of said intermediate base member;
    a relatively short movable base member adapted to be fixed to said instrument and also having a tongue portion which fits between said bearing portions at the other end of said intermediate base member;
    hinge means at each end of said intermediate base member for pivotally connecting it to said fixed base member and to said short movable base member;
    means attached to said hinge means for locking said base members at preselected angular positions relative to each other;
    said hinge means comprising a pin having threaded end extending through said bearing portions and the tongue portion at each end of said intermediate base member, said latter means including threaded handle means threaded on at least one said pin for pressing said bearing portions against the tongue portion between them to hold the base members in a predetermined angular position; and
    a set screw in one bearing portion at each end of said intermediate base member for engaging and holding a hinge pin to prevent its rotation when the handle is tightened, whereby the threaded ends of the pins are maintained oriented to fix the handles in predetermined positions when the base members are locked.

References Cited

UNITED STATES PATENTS

| | | | |
|---|---|---|---|
| 467,991 | 2/1892 | Frederick | 248—284 X |
| 768,048 | 8/1904 | Hogan | 248—284 X |
| 1,124,714 | 1/1915 | Denning | 248—278 X |
| 1,720,199 | 7/1929 | Barringer | 248—284 |
| 2,319,745 | 5/1943 | Napoli | 248—284 X |

ROY D. FRAZIER, Primary Examiner

J. F. FOSS, Assistant Examiner

U.S. Cl. X.R.

248—14, 284, 126